United States Patent Office 3,234,539
Patented Feb. 8, 1966

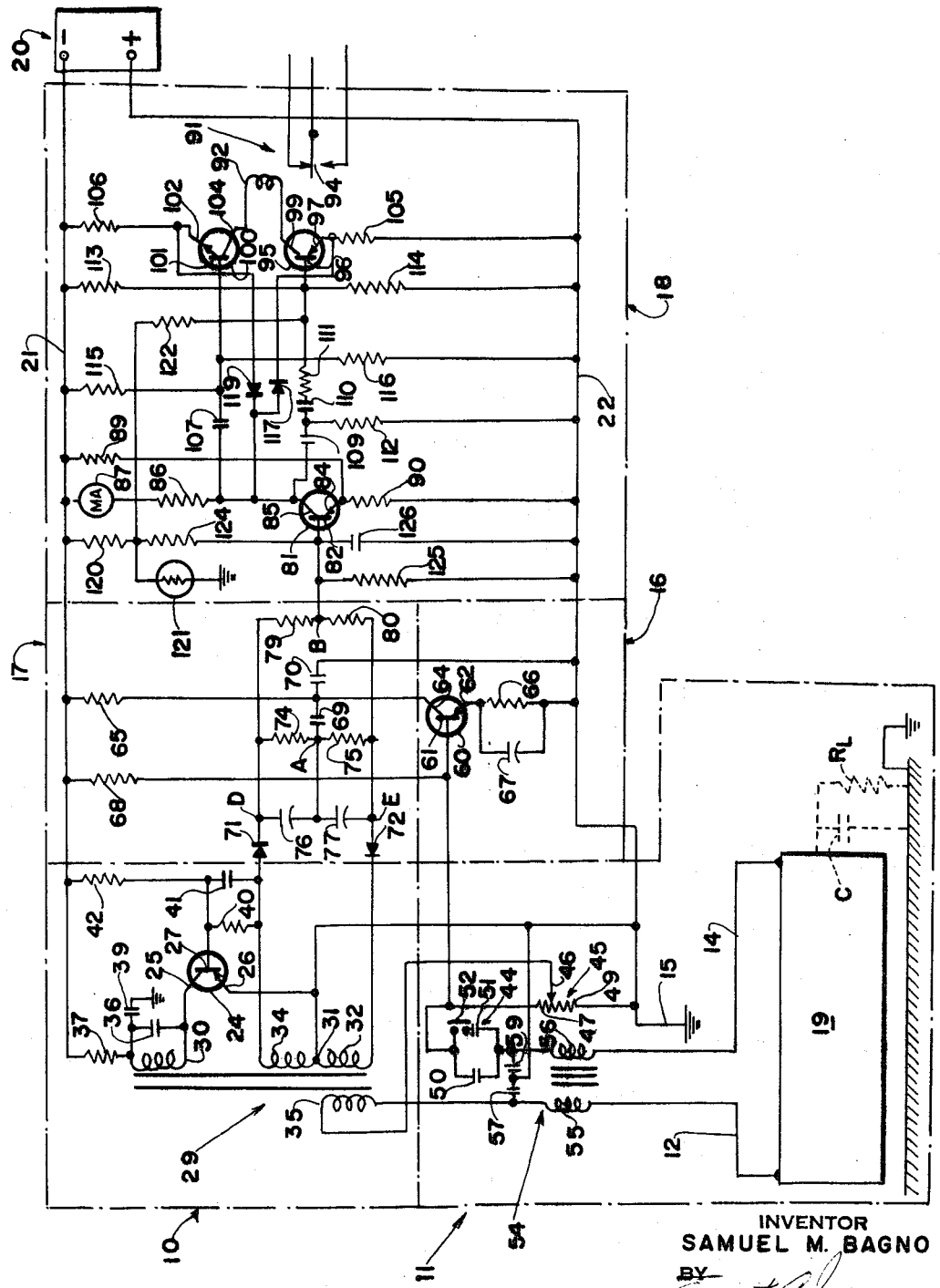

3,234,539
CAPACITY ALARM SYSTEM WITH A LOOP SENSOR HAVING AN INDUCTIVE RADIO FREQUENCY FILTER
Samuel M. Bagno, Belleville, N.J., assignor to Specialties Development Corporation, Belleville, N.J., a corporation of New Jersey
Original application Sept. 14, 1960, Ser. No. 56,008. Divided and this application Feb. 25, 1965, Ser. No. 435,280
3 Claims. (Cl. 340—258)

The present invention relates to alarm systems, and more particularly, to such systems which operate in response to capacity changes of an antenna produced by the presence of a person or object in the vicinity of the antenna.

The present invention is an improvement over previously known capacity operated alarm systems of the type wherein the impedance of a capacitor formed by an antenna system is balanced against other impedances in a bridge circuit energized by a high frequency oscillator.

In the previous systems the output of the bridge circuit is rectified in a conventional detector and utilized to actuate an alarm circuit. The detector output is dependent only on the degree of unbalance and the same output is produced for a given unbalance whether such unbalance is caused by a change in the capacity of the antenna system or by a change in the leakage resistance present between the oppositely poled antenna components.

With such systems therefore it is not possible to maintain the bridge in exact balance since any change in humidity or temperature subsequent to balancing would change the leakage resistance and unbalance the bridge.

It has been necessary therefore with previous systems of this type to prevent actuation of the alarm circuit in response to all bridge outputs having magnitudes which could be produced as a result of changes in the leakage resistance of the antenna system.

These systems, therefore, are lacking in sensitivity since they are only capable of detecting those changes in the antenna capacity which produce bridge outputs having magnitudes greater than those produced by normal resistance changes.

In addition, since the bridge circuit is frequently in an unbalanced condition, any variation in the amplitude of the oscillator will increase the bridge output and under certain conditions cause a false alarm to be given.

All previously known capacity operated systems also suffer from reduced efficiency in areas where strong radio frequency signals exist. These signals are received by the antenna of the system and appear at the output of bridge circuit. In areas where the strength of the radio signals at the bridge output is less than the output of the bridge due to the presence of an intruder, the system can be operated at reduced sensitivity, however in those areas where the radio signals are stronger, these systems are rendered completely useless.

Accordingly, it is an object of the present invention to provide a capacity alarm system not subject to the aforementioned difficulties.

Another object is to provide a system which is highly sensitive to capacity changes and insensitive to other conditions.

Another object is to provide such a system which discriminates between bridge unbalance due to capacity changes and bridge unbalance due to resistance changes.

Another object is to provide such a system which gives an indication in response to tampering.

Another object is to provide such a system which gives an indication when the antenna is severed.

Another object is to provide such a system which is insentive to received radio frequency signals.

Another object is to provide such a system which responds only to capacity changes taking place at a greater than predetermined rate.

A further object is to provide such a system which gives an indication when excessive bridge unbalance renders the system insensitive to changes in capacity at a normally detectable rate.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

The single figure of the drawing is a circuit diagram of a capacity alarm system in accordance with the present invention.

Referring to the drawing in detail, there is shown a system in accordance with the present invention which generally comprises an oscillator 10, a Wheatstone bridge circuit 11 energized by the oscillator 10 and having as one leg thereof an antenna system including wires 12 and 14 for forming an antenna loop and an antenna ground wire 15, an amplifier 16 for amplifying the output of the bridge 11, a phase sensitive detector 17 for producing an output related to the phase of the amplified bridge output, and a rate sensitive alarm initiator 18 for operating an alarm when the output of the detector 17 changes at a predetermined rate.

The antenna loop is formed by connecting the wires 12 and 14 to opposite ends of an electrically conductive unit 19, which is insulated from ground to form a capacitor C therewith, and is positioned so that the valve of the capacitor so formed is influenced by the presence of a person or object in the vicinity of the object or area to be protected. Between the antenna loop and ground there exists a leakage resistance represented in the drawing by the resistor $R_L$.

The conductive unit 19 could be a fence or wire positioned to protect an area, or it could be the object which is to be protected such as a metal shelf unit or a row of metal filing cabinets which are electrically interconnected to form the closed loop.

The system is powered by a 12 volt direct current supply 20 having a negative terminal connected to a conductor 21 and a positive terminal connected to a conductor 22.

The oscillator 10 includes a transistor 24 having a collector 25, an emitter 26, and a base 27, and an oscillating transformer 29 having a 200 turn collector winding 30, a 100 turn winding 31 having a grounded centertap to provide two 50 turn windings 32, 34, and a 100 turn output winding 35. The collector winding 30 is tuned by a 6,000 micromicrofarad capacitor 36 to provide an output frequency of 20,000 cycles per second. This tuned circuit is serially connected with a 8,200 ohm resistor 37 between the collector 25 and the conductor 21, and a 0.1 microfarad capacitor 39 is connected between ground and the junction of the tuned circuit and the resistor 37. The emitter 26 is connected to ground, and the base 27 is connected to receive feed back from the coil 34 through a 33,000 ohm resistor 40 and a 0.1 microfarad capacitor 41 in parallel therewith. A 313,000 ohm resistor 42 is connected between the conductor 21 and the base 27 in voltage dividing relationship with the resistor 40 to provide bias for the transistor 24.

The Wheatstone bridge circuit 11 includes, in addition to the antenna system, an adjustable capacity circuit 44, and a potentiometer comprising a resistor 45 and an adjustable contact 46 which divides the resistor 45 into portions 47 and 49. One side of the capacity circuit 44 and one side of the capacitor C are connected together through the wire 14, and the other sides of the circuit 44 and the capacitor C are respectively connected to the contact 46 through the resistor portion 47 and through the wire 15 and the resistor portion 49 whereby the circuit 44, the capacitor C, the resistor portion 47 and the resistor portion 49 form the legs of the bridge 11.

The adjustable capacity circuit 44 comprises a 1000 micromicrofarad capacitor 50 connected in parallel with a series circuit containing a 3000 micromicrofarad capacitor 51 and a switch 52, whereby the capacity of the circuit may be changed from 1000 micromicrofarads to 4000 micromicrofarads by closing the switch 52.

To provide the input to the bridge 11, the oscillator output winding 35 is connected directly to the potentiometer contact 46 and is connected through the wire 12 and the unit 19 to the junction of the capacitor C and the circuit 44.

A filter circuit 54 is provided in the bridge 11 to prevent radio frequency signals picked up by the antenna loop from appearing in the output of the bridge. The filter circuit 54 includes a pair of choke coils 55, 56 wound in series bucking relationship on a common core and respectively connected between the winding 35 and the wire 12 and between the wire 14 and the circuit 44, and a pair of 500 micromicrofarad capacitors 57, 59 respectively connected between ground and the junction of the winding 35 and the choke 55 and between ground and the junction of the circuit 44 and the choke 56.

The output of the bridge appears between the junction of the circuit 44 and the resistance portion 47 and the junction of the wire 15 and the resistance portion 49.

The amplifier 16 includes a transistor 60 having a base 61 and an emitter 62 connected to the output of the bridge 11 and a collector 64 connected to the conductor 21 through a 15,000 ohm resistor 65. A 1000 ohm resistor 66 and a 0.1 microfarad capacitor 67 in parallel therewith provide the connection between the emitter and the bridge output and a 270 ohm resistor 68 is connected between the base 61 and the negative conductor 21.

The output of the amplifier 16 is coupled to the phase detector by means of a .01 microfarad capacitor 69, and is filtered by a 500 micromicrofarad capacitor 70 connected between the collector 64 and ground to remove any radio frequencies signals passed by the filter 54. The outputs of the oscillator winds 32 and 34, which are 180 degrees out of phase, are also fed into the phase detector 17.

The phase detector 17 includes a diode 71 connected to the output of the winding 34, a diode 72 connected to the output of the winding 32, a pair of 10,000 ohm resistors 74, 75 connected in series with each other and with the diodes 71 and 72, a pair of 0.1 microfarad capacitors 76, 77 connected respectively in parallel with the resistors 74, 75, and a pair of 10,000 ohm resistors 79, 80 connected in series with each other and in parallel with the series circuit formed by the resistors 74 and 75. The diode 71 is arranged to conduct when the output end of the winding 34 is positive and the diode 72 is arranged to conduct when the output end of the winding 32 is negative. The input from the amplifier 16 is applied to the junction of the resistors 74 and 75, and the output of the phase detector appears at the junction of the resistors 79 and 80.

The alarm initiator 18 includes an amplifier comprising a transistor 81 having a base 82 connected to the output of the phase detector 17, an emitter 84, and a collector 85 connected to the negative conductor 21 through a load resistor 86 of 5,000 ohms and a milliammeter 87. A 22,000 ohm resistor 89 and a 120 ohm resistor 90 are connected in voltage dividing relationship between the conductors 21 and 22 to provide bias for the emitter 84.

The alarm initiator 18 also includes an alarm relay 91 having a winding 92 and a set of contacts 94, a PNP type transistor 95 having a base 96, an emitter 97, and a collector 99, and a NPN type transistor 100 having a base 101, an emitter 102, and a collector 104. The emitter 97 of the transistor 95 is connected to the positive conductor 22 through a 120 ohm resistor 105 and the emitter 102 of the transistor 100 is connected to the negative conductor 21 through a 120 ohm resistor 106. The collectors 99 and 104 are connected together through the relay winding 92 providing a series circuit between the conductors 22 and 21 for energizing the winding 92, and the relay contacts 94 are connected to operate an alarm circuit (not shown) when the winding 92 is de-energized. The collector 85 of the transistor 81 is connected to the base 101 of the transistor 100 through a 50 microfarad capacitor 107, and is also connected to the base 96 of the transistor 95 through a 1000 microfarad electrolytic capacitor 109, a 2000 microfarad electrolytic capacitor 110, and a 2,200 ohm resistor 111. The junction of the capacitor 109 and 110 is connected to the conductor 22 through a 100,000 ohm resistor 112.

A 500,000 ohm resistor 113 and a 6,800 ohm resistor 114 are connected in voltage dividing relationship between the conductors 21 and 22, and the base 96 is connected to receive bias from the junction thereof to normally place the transistor 95 in a conductive state. In like manner, a 8,200 ohm resistor 115 and a 100,000 ohm resistor 116 are connected in series between the conductors 21 and 22 and the base 101 is connected to the junction thereof to normally bias the transistor 100 into conduction.

The emitter 97 of the transistor 95 and the emitter 102 of the transistor 100 are connected to the collector 85 of the transistor 81 through zener diodes 117 and 119 respectively.

These diodes have a breakdown potential of 10 volts and are connected in a manner to oppose the flow of current therethrough from the conductor 22 to the conductor 21 when the voltage thereacross is less than the breakdown potential.

To temperature stabilize the transistors 81 and 95, a 47,000 ohm resistor 120 and a thermistor 121 are connected in series as a voltage dividing unit across the source 20. The junction of the resistor 120 and the thermistor 121 is connected to the base 96 and to the base 82 through a 47,000 ohm resistor 122 and a 47,000 ohm resistor 124 respectively. The resistance of the thermistor 121 varies with temperature to decrease the bias on the transistors 81 and 95 in response to ambient temperature increases. A 22,000 ohm resistor 125 and a 0.5 microfarad capacitor 126 are connected in parallel between the base 81 and the conductor 22.

In operation, when the oscillator 10 is in operation electrical energy flows between the ends of the output winding 35 through the bridge circuit 11.

The bridge circuit 11 is initially placed in a balanced condition by first adjusting the capacity circuit 44, by means of the switch 52, to the valve closest to that of the capacitor C and then adjusting the potentiomeer contact 46.

With the bridge so balanced the ratio of the impedance of the capacitor C to that of the resistor portion 49 is the same as that of the impedance of the circuit 44 to that of the resistor portion 47, and the amplifier 16 receives no input.

The diodes 71, 72 in the phase detector 17 allow current to flow from the winding 34 through the resistors 74, 75 and the resistors 79, 80 to the winding 32. When there is no output from the amplifier 16, the voltage dropped across the resistors 74 and 79 equals the voltage dropped across the resistors 75 and 80, since the junction of the windings 32 and 34 is at ground potential, the point A at the junction of resistors 74 and 75 is at ground potential, and the point B at the junction of resistors 79 and 80 is removed from ground potential only by the bias on the base 82. Therefore, the transistor 81 in the alarm initiator receives no input from the phase detector 17.

The transistor 81 is normally biased to conduct a collector current of 0.5 milliampere and the transistors 95 and 100 are also biased to conduct and hold the relay 91 energized. The capacitor 107 and the capacitors 109, 110 isolate the transistors 100 and 95 respectively from the effect of the steady state voltage at the collector 85 and render them responsive only to changes in the voltage at the collector 85 which are at a greater than predetermined rate.

The bridge circuit 11 becomes unbalanced and produces an output when the value of the capacitor C increases or decreases in response to the movement of a person or object into or out of the field thereof; when the value of the leakage resistance $R_L$ increases or decreases in response to atmospheric changes; or when the antenna loop is disrupted disconnecting the capacity circuit 44 from the oscillator output.

The output of the bridge is amplified by the amplifier 16 and is applied to the phase detector at the junction of the resistors 74 and 75 of the phase detector.

The current flow through the diodes 71 and 72 of the phase detector is in the form of half cycle pulses and when there is no output from the amplifier 16 the voltages appearing at points D and E are equal and of opposite polarity.

When a varying current is flowing in the emitter collector circuit of the transistor 60, the voltage variations at the collector thereof are passed through the capacitor 69 and alternating current flows between the point A and the grounded junction of the windings 32 and 34.

It can be seen that if the amplifier output is in phase with the current flowing through the diodes, the point A has a positive potential when the point D is positive and the point E is negative. The amplifier output during this half cycle flows from the point A to ground through the capacitor 77 and the diode 72, increasing the current through the diode 72 and decreasing the current through the diode 71 thus causing the positive potential at the point D to decrease and the negative potential at the point E to increase.

The potential with respect to ground of the point B is equal to the potential at the point D minus one half the total potential difference between the point D and E. Therefore, since the total potential difference between the points D and E remains constant, it can be seen that when the potential at the point D decreases, the potential at the junction point B assumes a negative value.

On the succeeding half cycle when the junction point A has a negative potential with respect to ground there is no current flowing through the diodes, and the capacitors 76 and 77 discharge to maintain a substantially constant negative potential at the point B.

This negative output of the phase detector increases the conductivity of the transistor 81 thus lowering its collector voltage. When the output of the phase detector changes at a greater than a predetermined rate, the decrease in collector voltage is fed through the capacitors 109, 110 and drives the base of the transistor 95 toward its emitter voltage decreasing its collector current and causing the relay 91 to drop out.

The use of the second electrolytic capacitor 110 prevents excessive direct current leakage through the capacitor 109 from making the base of the transistor 95 insensitive to changes in the collector voltage. Any leakage current through the capacitor 109 will be bypassed to ground through the resistor 112 and any sudden changes in the current through the resistor 112 is passed through the capacitor 110 to the transistor 95.

In like manner, it can be seen that if the amplifier output is 180 degrees out of phase with the current flowing through the diodes then the point A is negative when the point D is positive and when the point E is negative. The amplifier output during this half cycle flows from ground to the point A through the diode 71 and the capacitor 76 to increase the flow through the diode 71 and decrease the flow through the diode 72. The positive potential of point D then increases and the negative potential of point E decreases causing the point B to assume a positive potential which during the next half cycle is supplied by the discharge of the capacitors 76 and 77.

The positive output of the phase detector decreases the conductivity of the transistor 81 thus increasing its collector voltage. If the increase in collector voltage is sufficiently rapid it is fed through the capacitor 107 and drives the base of transistor 100 toward its emitter voltage decreasing its collector current and causing the relay to drop out.

It can further be seen that if the output of the amplifier is 90 degrees out of phase with the current flowing through the diodes, the point A moves from a maximum value of one polarity to a maximum value of the opposite polarity while the point D is moving through a half cycle of positive values and the point E is moving through a half cycle of negative values. Therefore, the amplifier output produces no change in the average potentials at the points D and E, and the point B is maintained at the biasing potential normally impressed on the base 82.

The phase of the amplifier output is determined by the values of the reactive elements in the bridge circuit 11 and the amplifier 16 and also by the direction in which the value of the capacitor C changes, the phase of the output caused by an increase in the value of the capacitor C being 180 degrees out of phase with the output produced by a decrease in the value of the capacitor C.

Due to the effect of the reactive elements, when the bridge is unbalanced the phase of the amplifier output is such that the reactive component of the output voltage is in phase or 180 degrees out of phase (depending on the direction of the unbalance of the bridge) with the current through the diodes 71, 72 and the resistive component of the output voltage is 90 degrees out of phase with this current. It can be seen therefore that this phase detector is sensitive only to the reactive component of the amplifier output.

When the bridge is capacitively unbalanced, due to motion of a person or object toward or away from the antenna loop or by a discontinuity in the antenna loop, the output of the amplifier develops rapidly and contains a large reactive component. The phase detector, therefore, produces an output (either positive or negative) which causes the transistor 81 to change its conductive state at a rate sufficient to cause the relay to drop out and give an alarm.

When, however, the bridge is resistively unbalanced, due to change in the value of the leakage resistance $R_L$ resulting for example from an atmospheric change, the output of the amplifier develops slowly and contains only a small reactive component even though the degree of bridge unbalance might be considerable. Since the reactive component of the amplifier output is small, the phase detector is essentially insensitive to the output of the amplifier, therefore, in order for the alarm to be sounded as a result of a resistive unbalance, the unbalance would have to take place at a much greater rate than that necessary under a capacitive unbalance situation. Such a rapid resistance change would indicate an abnormal condition which would require investigation.

When the bridge circuit 11 is excessively unbalanced, for example as a result of the antenna loop being severed or shorted to ground, the transistor 81 is placed in either a saturated or a non-conducting condition rendering the system insensitive to changes in capacity at a normally detectable rate.

Under such conditions, the collector 85 assumes either a high negative or a high positive value and one of the zener diodes 117, 119 conducts causing its associated transistor 95 or 100 to move toward non-conduction and release the relay 91.

Also, it is evident that any attempt to disable the system by disconnecting the power source 20 will cause the relay 91 to be released.

In areas adjacent radio or television transmitters, considerable radio frequency energy is received by the antenna loop and would, if not removed, produce a signal at the bridge output much stronger than that produced by bridge unbalance thereby rendering the system insensitive to the bridge condition. In the present system such radio frequency energy is removed by the filter 54 in the following manner.

The radio frequency currents generated in the antenna loop flow between the unit 19 and the grounded junction of the capacitors 57 and 59 through parallel paths one of which includes the wire 12, the choke coil 55 and the capacitor 57 and the other of which includes the wire 14, the choke coil 56 and the capacitors 59. The coils 55 and 56 interact to present a high impedance to parallel currents flowing therethrough, and the capacitors 57 and 59 present a low impedance path to ground for radio frequency currents. The radio frequency currents therefore are attenuated by the coils 55 and 56 and shorted to ground through the capacitors 57 and 59 thereby their appearence at the bridge output is prevented.

In addition to functioning as components of the high frequency filter, the coils 55 and 56 also contribute to the adjustment of the phase angle of the output of the amplifier 16 by producing a phase shift in a direction opposite to the phase shift produced by the capacitor C. The phase shift produced by the coils is constant and therefore does not affect the detection of a change in the value of the capacitor C.

From the foregoing description, it will be seen that the present invention provides a capacity alarm system which is highly sensitive to capacity changes occurring at a greater than predetermined rate and to abnormal conditions, and is insensitive to extraneous normal conditions such as atmospheric conditions and radio signals.

As various changes may be made in the form, construction and ararngement of the parts herein, without departing from the spirit and scope of the invention and without sacrificing any of its advantages, it is to be understood that all matter herein is to be interpreted as illustrative and not in any limiting sense.

I claim:

1. A capacitance operated indicating system comprising a source of alternating current electrical energy, antenna loop means energized by said source for providing a capacitance across an area to be protected, capacity monitoring means including impedance elements cnnected to one end of said antenna loop to form a bridge circuit with said capacitance across said area to be protected, means for giving an indication in response to a change in the output of said capacity monitoring means, and radio frequency filtering means for preventing raido frequency signals induced in said antenna loop means from producing a change in the output of said capacity monitoring means, said filtering means including a first inductance connected to one end of said antenna loop and a second inductance connected to the other end of said antenna loop, said inductances being arranged in series bucking relationship.

2. A capacitance operated indicating system comprising a source of alternating current electrical energy, antenna loop means having first and second ends, said first end being connected to said source to energize said loop means for providing a capacitance between said loop means and electrical ground across an area to be protected, capacity monitoring means including impedance elements connected to said second end of said antenna loop and to electrical ground to form a bridge circuit with said capacitance across said area to be protected, means for giving an indication in response to a change in the output of said capacity monitoring means, and radio frequency filtering means for preventing radio frequency signals induced in said antenna loop means from producing a change in the output of said capacity monitoring means, said filtering means including a first inductance connected between said source and said first mentioned end of said loop means and a second inductance connected between said second end of said loop means and said capacity monitoring means, said inductances being arranged in series bucking relationship.

3. A system according to claim 2, wherein said filtering means includes first and second capacitors having low impedance to radio frequency for conducting radio frequency currents to ground, said first capacitor being connected between electrical ground and the junction of said first inductance and said source, and said second capacitor being connected between electrical ground and the junction of said second inductance and said capacity monitoring means.

No references cited.

NEIL C. READ, *Primary Examiner.*